Sept. 24, 1946.  H. E. BYER  2,408,290
COUNTER-CURRENT CONDENSER
Filed Nov. 24, 1943
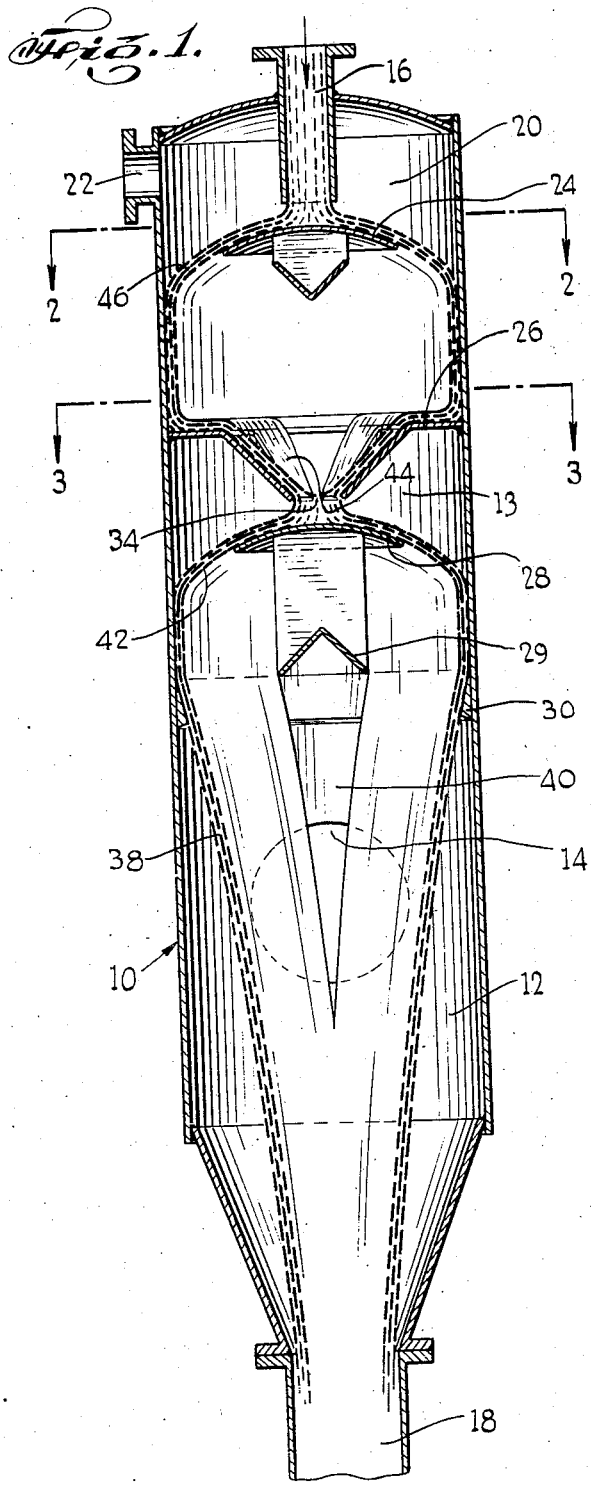
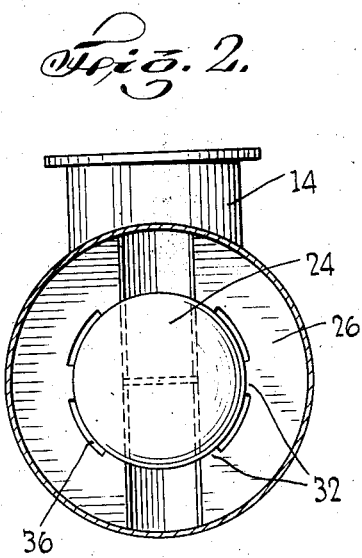
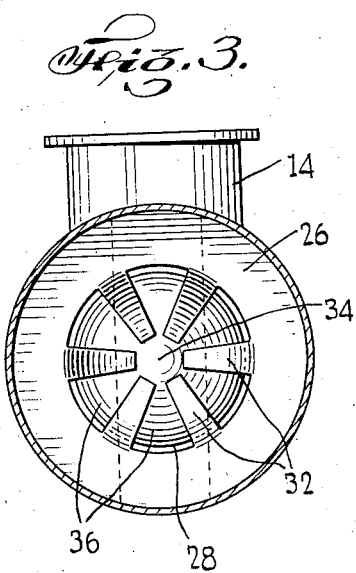
INVENTOR
HENRY E. BYER
BY
*Hammond & Littell*
ATTORNEY Patented Sept. 24, 1946

2,408,290

UNITED STATES PATENT OFFICE 2,408,290

COUNTERCURRENT CONDENSER

Henry E. Byer, Bernardsville, N. J.

Application November 24, 1943, Serial No. 511,534

6 Claims. (Cl. 261—111)

This invention relates to an improved condenser and, in particular, to the type of countercurrent condenser for the condensation of steam or other gases as described in my Patent No. 2,013,029, patented September 3, 1935.

In said patent I have disclosed an improved apparatus for contacting a gas and a liquid flowing in counter-current. Such an apparatus may be used advantageously for the condensation of steam with a counter-current flow of water or in scrubbing and condensing other gases. In condensing steam, the steam is passed through a multiplicity of balanced curtains of water formed by weirs and deflectors. I have now found a further improvement which renders the condenser more efficient while maintaining my compact and simplified structure.

In the apparatus shown in my previous patent the water is caused to overflow a concentric weir on to a centrally located baffle below the weir. When operating in accordance with the designed flow rate, the water column forms a frusto-conical closed curtain having its apex at the center of the weir thereby forming a closed curtain of water between the weir and the baffle. It is the purpose of the baffle to deflect the water from the apex of the conical frustrum in such a manner that it overflows the edges of the baffle into contact with the walls of the condenser as a smooth flowing solid curtain of water. The water then flows along the walls of the condenser and is again deflected from them by a deflector positioned thereon. The two curtains of water extending between the baffle and the condenser walls, and between the weir and baffle form a closed secondary steam condensing chamber with the condenser. This secondary chamber contributes materially to the efficient operation of the condenser. Any disruption or break in the curtains of water, however minute, adversely affects the efficient operation of this condenser.

I have found that the condenser described in said Patent 2,013,029 operates efficiently at the designed flow rate for the water but that any appreciable decrease in the flow of the water causes interruptions in the curtains of water between the weir and the baffle and below the baffle, breaks the vacuum, upsets the stabilized operation of the condenser, and results in a material loss in the product output of the apparatus the condenser serves. A decrease in the flow of the water below that for which the condenser is designed thins the curtain of water flowing between the weir and the baffle below it and causes the curtain to spread to approximately the shape of a cylinder instead of an inverted cone with the lower base of the cylindrical sheet of water near the edges of the baffle. Water flowing in this manner tends to spatter when it contacts the baffle and causes waves or ripples in the water flowing over the edges of the baffle. Such a decreased flow of water frequently causes breaks in either or both of the curtains of water between the baffle and the weir or between the baffle and the condenser walls with a resulting inefficient operation referred to above. Thus, the apparatus described in this patent does not operate efficiently where the flow rate of the water varies appreciably from the designed flow rate.

It is a special object of my invention to provide a condenser of a simplified and compact structure that will operate uniformly under varied conditions of use and with varied flows of water.

A further object of my invention is to provide a compact multiple chamber condenser which will provide solid curtains of liquid without materially decreasing the amount of surface contact between the liquid and the gas over wide variations in the water flow.

It is another object of my invention to provide a steam condenser in which thin solid curtains of water flowing counter-current to the steam will not be broken or blown aside even though the flow of water is below normal or fluctuates.

Additional objects, purposes and advantages of my invention will appear from the disclosure taken in connection with the attached drawing which illustrates a preferred form of embodiment thereof and in which:

Figure 1 is a vertical section through my improved condenser,

Figure 2 is a horizontal section taken along the line 2—2 of Figure 1, and,

Figure 3 is a horizontal section along line 3—3 of Figure 1 and diagrammatically represents details of structure of an improved water leader.

The condenser 10 shown in Figure 1 is provided with a main condensing chamber 12 into which the steam or other gases to be condensed or washed enter through the conduit 14. The condensing liquid enters the condenser 10 through the inlet 16 and after flowing through the condenser passes through the outlet 18. The uncondensed gases collect in the upper portion of the condenser 20 and are withdrawn through the outlet 22.

In the embodiment shown, a baffle 24 is located below the water inlet 16 to deflect the water along the sides of the condenser 10, below the point of impact of the water. The condenser 10 is provided with a perforate water leader 26 converging toward an orifice 34 positioned above an umbrella shaped baffle 28, which again deflects the water along the sides of the condenser 10. The baffle 28 is advantageously provided with a support 29 in the form of an inverted V. The condenser 10 is provided with a deflector ring 30 below the baffle 28 which deflects the water in a curtain spaced from the walls of the chamber 12.

As shown in Figure 3, the perforate water leader 26 is provided with radial fingers 32 converging downwardly to an orifice 34. Between the fingers there are perforations or unobstructed passageways 36, which are wider toward the outer circumference, providing a contact surface between the liquid and gas medium, through which gases may pass. The pressure equilibrium within the condenser and the surface tension of the water is such that the water leader 26 will support a very thin curtain of water on its radially converging fingers 32 which will be discharged in a solid curtain near the center of the baffle 28.

In the operation of the condenser, as shown, the water flows into the inlet 16 or any other suitably positioned inlet on to the umbrella shaped baffle 24 and thence is spread and deflected against the sides of the condenser 10. The water then flows along the side of the condenser into contact with the perforate water leader 26. The water flows over the surface of the water leader 26 and flows in a frustro-conical solid curtain of water over the radial fingers 32 and bridging across the unobstructed passageways 36 to an orifice or apex 34 near the center of the condenser and then on to the second umbrella baffle 28. This solid sheet of water is deflected from the umbrella baffle 28 into contact with the walls of the condenser 10. The water flows along the walls of the condenser 10 and is deflected therefrom by the deflector ring 30 into a curtain spaced from the walls 10 of the chamber 12.

The steam or other gases to be condensed or washed enter the condensing chamber 12 through the inlet 14 into contact with the sheet of water or other liquid 38 having openings 40 therein formed by the baffle support 29. The main condensation takes place in the chamber 12, and the condensate is removed with the condenser water through the outlet 18. However, any uncondensed steam or gases or any uncondensable gases then flow from the chamber 12 through the solid curtain of liquid 42 to the chamber 13. From the chamber 13 the gases pass through openings 36 in the water leader 26 and through the curtain of liquid 44 on the surface of the fingers 32 into the upper portions of the condenser 10. The uncondensed or washed gases are withdrawn through the gas outlet 22. In the normal operation of the apparatus where steam is being condensed, all of the steam will have been condensed by the time it passes through the secondary condensing chamber 13 into the upper portions of the condenser. However, in the apparatus as disclosed, the uncondensed gases are further contacted by a sheet of water 46 deflected from the upper baffle 24 before they are withdrawn through the gas outlet 22.

In this construction thin sheets of water flow through the condenser evenly and without any pulsating effect. The construction of the water leader 26 is such as to cause an even flow of water at all times on to the center of the baffle 28. The thinning out and spreading of the water column is prevented. At all times, a substantially solid curtain of water is maintained between the primary condensing chamber and the secondary condensing chamber and between the secondary condensing chamber and the upper portion of the condenser thereby preventing the breaking of the vacuum which is necessary to the efficient operation of the condenser. Losses in efficiency which normally occur in condensers of the prior type wherein there is a considerable fluctuation from the designed water flow rate are avoided. This condenser is inexpensive to manufacture and maintain due to its small number of parts and may be readily installed due to its compact nature.

The perforate water leader 26 which directs the flow of water from the walls of the condenser to the center where it flows on to the baffle 28 may be variously designed and the fingers 32 may be given a greater slope or be brought nearly to the horizontal without materially affecting the operation of the condenser provided the water leader 26 is so arranged as to cause all of the water flowing thereover to deposit in a solid stream on the center of the baffle 28 when the condenser is in operation. As the water converges to the orifice 34 the thickness of the sheet of water increases and the weight of the water per unit of area likewise increases, thereby giving a discharging sheet of water weighted at the point of discharge. This discharging water always weighs more per unit of area than the pressure of the gaseous medium per unit of area and as a result the water is not lifted or blown aside at the center of the water leader 26. The inwardly converging sheet of water flowing over the fingers 32 of the water leader 26 and across the perforations 36 is thinner at the outer circumference of the perforations 36 than the weighted sheet of water discharging through the orifice 34 on to baffle 28 and forms a solid sheet of water 44 in a state of balance with the gases which readily pass through the thin sheet flowing across the perforations 36 without materially breaking the solid film of water.

While I have shown a preferred form of embodiment of my condenser, it will be understood that modifications may be made therein, and I therefore desire an interpretation of my invention which is within the scope and spirit of the description thereof, and of the claims appended hereto.

I claim:

1. In a counter-current condenser, a leader for conducting water inwardly from the walls of the condenser and discharging it in a substantially unbroken stream at the center of a condenser which comprises an annular substantially horizontal ledge contacting with the walls of the condenser and adapted to turn the water inward, a plurality of spaced fingers extending inwardly and downwardly from said annular ledge and terminating in a substantially circular opening near the center of the condenser, with the spaces between said fingers being larger where the fingers meet said annular wall.

2. In a counter-current gas and liquid contact apparatus of the class described, a vertical cylindrical chamber having a liquid inlet near the top, and a liquid outlet near the bottom, a gas inlet near the bottom, and a gas outlet near the top, means to spread a liquid entering substantially at the center of the chamber into a thin sheet flowing downwardly along the walls thereof, means to again converge said liquid into a column flowing downward substantially at the center of said chamber, and means to again spread said liquid into a thin sheet flowing downwardly along the walls of said chamber, while permitting gas to contact and pass through said liquid, said converging means comprising a water leader contacting with the walls of said column and having a horizontal ledge near the column walls with a plurality of fingers extending inwardly and downwardly from said ledge and forming an opening substantially at the center of said column, and openings between said fingers through which a gas may pass.

3. In a steam condenser of the class described, a main condensing chamber, a secondary steam condensing chamber, a gas collection chamber with a gas outlet, a water inlet for the condenser, a centrally located baffle, and means to form a substantially continuous thin curtain of water through which gas may pass from said secondary chamber to said gas collection chamber including an annular water leader extending to the walls of said condenser and adapted to lead water therefrom to the center of said condenser in a continuous sheet and onto said baffle, said water leader having discontinuous walls with apertures of substantial size through which said gas may pass, said leader extending to a relatively restricted orifice at the center of the condenser and converging said continuous sheet of water on said baffle in a frusto-conical column, said baffle serving to deflect the water to the walls of the condenser and to form a curtain of water between said main chamber and said secondary chamber.

4. In a steam condenser of the class described, a main condensing chamber, a secondary steam condensing chamber, a gas collection chamber with a gas outlet, a water inlet for the condenser, a centrally located baffle, and means to form a substantially continuous thin curtain of water through which gas may pass from said secondary chamber to said gas collection chamber including an annular water leader extending to the walls of said condenser and adapted to lead water therefrom to the center of said condenser and onto said baffle, said water leader having fingers extending relatively inwardly and downwardly from said walls to a restricted orifice at the center of the condenser to converge said continuous sheet of water on said baffle in a substantially frustro-conical column, said baffle serving to deflect the water to the walls of the condenser and to form a curtain of water between said main chamber and said secondary chamber.

5. In a counter-current gas and liquid contact apparatus of the class described, a vertical cylindrical chamber having a liquid outlet near the bottom, a gas inlet near the bottom, and a gas outlet near the top, means to spread a liquid entering substantially at the center of the chamber into a thin sheet flowing downwardly along the walls thereof, means to again converge said liquid into a column flowing downward substantially at the center of said chamber, and means to again spread said liquid into a thin sheet flowing downwardly along the walls of said chamber while permitting gas to contact and pass through said liquid, said converging means comprising a water leader contacting with the walls of said column and having a ledge near the column walls with a plurality of fingers extending relatively inwardly and downwardly from said ledge and forming an opening substantially at the center of said column and openings between said fingers through which a gas may escape.

6. In a counter-current gas and liquid contact apparatus of the class described, a vertical contact chamber having a liquid inlet near the top and a liquid outlet near the bottom, a gas inlet near the bottom and a gas outlet near the top, a plurality of annular liquid deflectors between the gas inlet and the liquid inlet including a water leader extending from the walls of the chamber inwardly and converging to an orifice positioned centrally of the chamber and above a centrally located baffle, said leader converging the liquid flowing from the walls of said chamber into a thin sheet, while permitting gas to contact and pass therethrough, and into a column flowing downward substantially at the center of said chamber onto said centrally located baffle, said leader being provided with unimpeded passageways through which said gas may pass and converging to said orifice positioned centrally of the chamber, the upper part of the passageways being of larger dimensions toward the outer circumference of the water leader, said baffle deflecting the liquid from the center and against the walls of the chamber.

HENRY E. BYER.